United States Patent
Graab et al.

(10) Patent No.: US 9,302,682 B2
(45) Date of Patent: Apr. 5, 2016

(54) MULTIPLE COMPRESSOR SYSTEM AND METHOD FOR LOCOMOTIVES

(75) Inventors: Donald Dietrich Graab, Alpharetta, GA (US); Bruce Edward Backus, Kennesaw, GA (US)

(73) Assignee: NORFOLK SOUTHERN CORPORATION, Norfolk, VA (US)

( * ) Notice: Subject to any disclaimer, the term of this patent is extended or adjusted under 35 U.S.C. 154(b) by 1113 days.

(21) Appl. No.: 13/093,949

(22) Filed: Apr. 26, 2011

(65) Prior Publication Data

US 2012/0272857 A1 Nov. 1, 2012

(51) Int. Cl.
| | |
|---|---|
| B61C 3/00 | (2006.01) |
| B61C 17/00 | (2006.01) |
| F02D 23/00 | (2006.01) |
| F02D 29/02 | (2006.01) |
| F02D 41/00 | (2006.01) |
| F02D 41/04 | (2006.01) |

(52) U.S. Cl.
CPC ............... B61C 17/00 (2013.01); F02D 23/00 (2013.01); F02D 29/02 (2013.01); *F01P 2060/18* (2013.01); *F02D 41/0007* (2013.01); *F02D 41/042* (2013.01); *Y02T 10/144* (2013.01)

(58) Field of Classification Search
CPC ............ B61C 17/00; B61C 1/18; B61C 7/00; F02N 19/10; F01P 2060/18
USPC ............................................................ 237/5
See application file for complete search history.

(56) References Cited

U.S. PATENT DOCUMENTS

| | | | | |
|---|---|---|---|---|
| 2,626,100 | A | * | 1/1953 | McIntyre ...................... 417/44.7 |
| 2,729,203 | A | * | 1/1956 | Prendergast ............... 123/41.12 |
| 2,729,230 | A | * | 1/1956 | Kenney ......................... 137/204 |
| 3,457,877 | A | | 7/1969 | Ostermeyer |
| 3,785,755 | A | | 1/1974 | Novak |
| 3,856,493 | A | * | 12/1974 | Bulkley .......................... 62/401 |
| 4,192,274 | A | * | 3/1980 | Damon ................... 123/142.5 R |
| 4,711,204 | A | | 12/1987 | Rusconi |
| 4,825,663 | A | * | 5/1989 | Nijjar et al. ..................... 62/236 |
| 5,528,901 | A | | 6/1996 | Willis |
| 6,068,447 | A | * | 5/2000 | Foege ............................. 417/12 |
| 6,257,680 | B1 | * | 7/2001 | Jacob ........................... 303/9.73 |
| 6,470,844 | B2 | * | 10/2002 | Biess ..................... 123/142.5 R |

(Continued)

OTHER PUBLICATIONS

Int'l Search Report (Jul. 24, 2012).
Written Opinion (Jul. 24, 2012).

*Primary Examiner* — Avinash Savani
*Assistant Examiner* — Deepak Deean
(74) *Attorney, Agent, or Firm* — Goodwin Procter LLP

(57) ABSTRACT

A system and method for maintaining a supply of compressed air on a locomotive. In one embodiment of the invention a compressed air system for a railroad locomotive comprises: a first air compressor; a second air compressor; a layover heater for maintaining the temperature of engine coolant; and a control system, wherein the first air compressor, the second air compressor, the layover heater, and the control package can be powered by at least one of the following power sources: an onboard electrical power source; or an offboard power source, wherein the layover heater can utilize heat generated by the first air compressor and the second air compressor to maintain the temperature of engine coolant, and wherein the control system operating the compressed air system utilizes a first logic when the power source is the onboard electrical power source and a second logic when the power source is the off board power source.

14 Claims, 3 Drawing Sheets

(56) References Cited

U.S. PATENT DOCUMENTS

| | | | |
|---|---|---|---|
| 6,650,993 B2* | 11/2003 | Wolf et al. | 701/112 |
| 6,928,972 B2* | 8/2005 | Biess et al. | 123/142.5 R |
| 7,769,537 B2* | 8/2010 | Gates et al. | 701/113 |
| 2002/0103585 A1* | 8/2002 | Biess et al. | 701/35 |
| 2004/0140366 A1 | 7/2004 | Uzkan | |
| 2004/0189099 A1* | 9/2004 | Wild | 307/80 |
| 2006/0005736 A1* | 1/2006 | Kumar | 105/1.4 |
| 2008/0164850 A1* | 7/2008 | Ayana et al. | 322/1 |
| 2009/0254246 A1* | 10/2009 | Yang et al. | 701/36 |
| 2011/0011113 A1* | 1/2011 | Jordan | 62/291 |
| 2011/0083578 A1 | 4/2011 | Sami | |

* cited by examiner

MULTIPLE COMPRESSOR SYSTEM AND METHOD FOR LOCOMOTIVES

TECHNICAL FIELD

The present invention is in the field of locomotive diesel engines and compressed air systems. More particularly, the present invention is in the technical field of air compressor systems for diesel locomotive engines utilizing multiple air compressors, control and power circuits, and a layover heating system.

BACKGROUND OF THE INVENTION

Air compressor systems for internal combustion engines, such as those powering locomotives, are known in the art for the purpose of generating compressed air to be used in the braking and auxiliary systems of the locomotive. For example, a prior art air compressor system may include a multi-cylinder air compressor with a pair of low pressure cylinders and a high pressure cylinder mounted on and supported by a crankcase. Generally, the air compressor is powered by the locomotive engine and is unavailable for use while the locomotive is shut down.

Layover heater systems for internal combustion engines are also known in the art. These layover heater systems generally maintain engine coolant above certain temperatures when ambient temperatures are not sufficient to maintain the engine coolant. Keeping the engine coolant above certain temperatures enables idling locomotives to be shut down and easily restarted, even after days sitting in freezing weather. Equipping a locomotive with a layover heater helps to prevent problems associated with engine idling including wasted fuel and oil, wet-stacking, emissions, noise and engine wear.

The traditional air compressor systems of the prior art have a disadvantage because they can not be powered when the locomotive engine is shut down. This lack of a constant supply of air pressure can delay the locomotive's departure by prolonging the brake departure test protocol. Further, the heat generated by the air compressor is not utilized and is instead considered waste heat.

The disclosed multiple air compressor system and method is directed to overcoming one or more of the disadvantages listed above.

SUMMARY OF THE INVENTION

In one aspect, the present invention disclosed herein is directed to a compressed air system for a railroad locomotive comprising: a first air compressor; a second air compressor; a layover heater for maintaining the temperature of engine coolant; and a control system, wherein the first air compressor, the second air compressor, the layover heater, and the control package can be powered by at least one of the following power sources: an onboard electrical power source; or an offboard power source, wherein the layover heater can utilize heat generated by the first air compressor and the second air compressor to maintain the temperature of engine coolant, and wherein the control system operating the compressed air system utilizes a first logic when the power source is the onboard electrical power source and a second logic when the power source is the off board power source.

DETAILED DESCRIPTION OF THE INVENTION

The present application is directed toward the technical field of compressor systems for diesel engines utilizing multiple air compressors, control and power circuits, and a layover heating system.

Figure 1:
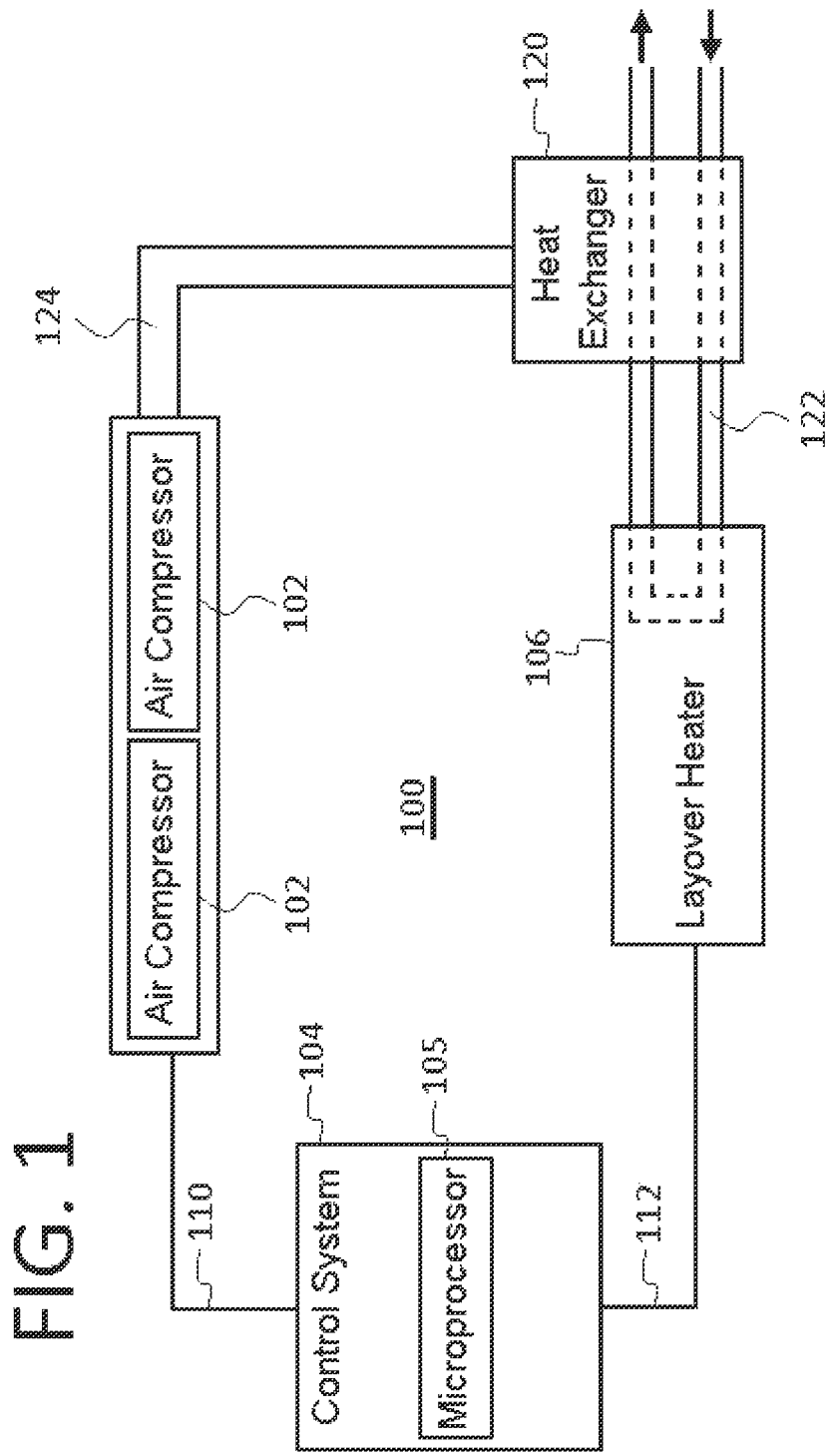
FIG. 1 is a diagram of a multiple air compressor system for a diesel locomotive engine according to one embodiment the present invention.

Referring to FIG. 1, one embodiment of the present invention is depicted. Multiple compressor system 100 may include at least two air compressors 102, a layover heater 106, and a control system 104.

Each air compressor 102 may be a rotary screw type air compressor, or any other type of air compressor known in the art. Each air compressor 102 may be rated at 60-80% of the minimum industry specified capacity for generating compressed air for locomotive breaking and auxiliary systems. Unlike traditional locomotive air compressor arrangements, air compressors 102 may be powered by shore power in addition to the electrical current generated by the onboard locomotive systems. Shore power may include 440 volt alternating current supplied from the commercial power grid, or any other type of commercially available power. An appropriate power plug and cord may be plugged into the locomotive from ground level to provide the shore power when the internal combustion engine is shut down or not operating at full capacity.

Layover heater 106 may include an electrical heating system for maintaining the temperature of the engine coolant system above a certain temperature in freezing weather. Unlike traditional locomotive layover heater systems, in one mode of operation, layover heater 106 may include an electric heating element powered by shore power in addition to the electrical current generated by the onboard locomotive systems. Shore power may include 440 volt alternating current supplied from the commercial power grid, or any other type of commercially available power. An appropriate power plug and cord may be plugged into the locomotive from ground level to provide the shore power when the internal combustion engine is shut down or not operating at full capacity. Alternatively, or in cooperation with the electric heating element, layover heater 106 may utilize the heat generated by the air compressors 102 to warm engine coolant 122, minimizing the need to operate the layover heater 106.

The control system 104 may include a microprocessor 105. Control system 104 may be operatively connected 110 to air compressors 102. Control system 104 may communicate with air compressors 102 along operative connection 110, and may also receive status signals from air compressors 102 along operative connection 110.

Additionally, control system 104 may be operatively connected 112 to a layover heater 106. Control system 104 may communicate with layover heater 106 along operative connection 112, and may also receive status signals from layover heater 106 along operative connection 112. Via operative connections 110 and 112, control system 104 may monitor data such as the demand for power by the air compressors 102 and layover heater 106, prioritizing the need for both systems and allocating current flow to maintain the desired level of compressed air and desired coolant temperature.

As used in FIG. 1 and the following figures and descriptions, operative connection or operative communication includes any type of wired or wireless communication. In a preferred embodiment, operative connections 110, 112 may comprise a wired data connection.

Multiple compressor system 100 may also include a heat exchanger 120 which may be a heat exchanger device of any type used in the art of heat transfer systems. As the engine coolant 122 flows through the heat exchanger 120 and the layover heater 106, it may be heated by the waste heat from air compressors 102 carried via oil 124 and transmitted through heat exchanger 120 and/or heat from the layover heater 106. As the engine coolant 122 accumulates more energy, it will return to a higher temperature. As the engine coolant 122 exits the heat exchange device, it may be directed back into the locomotive engine.

Control system 104 will monitor the engine coolant 122 and attempt to maintain the engine coolant 122 within a predetermined temperature range. In one embodiment, the predetermined temperature range may be between 13° F. and 185° F. When only one air compressor 102 is energized and operating, the layover heater 106 may also be energized to provide heat to the engine coolant 122. If system air pressure demand requires the operation of both air compressors 102, the layover heater 106 will be deenergized as long as both air compressors 102 are energized. Additionally, in one embodiment, shore power will not be utilized unless the locomotive is shutdown and will automatically de-energize and sound an alarm should the engine start running while shore power is energized.

The control system 104 will monitor the engine coolant 122 and activate an alarm should the heating operation be requested with insufficient engine coolant 122 available. In another embodiment, there will be a mode of operation to run only the layover heater and not either of the air compressors 102.

By maintaining the engine coolant 122 at or above a certain temperature, the present invention may enable a railroad locomotive to be maintained at fully prepared status for deployment with no local emissions from an internal diesel engine. Because commercial power may be generated more efficiently at large generating stations, emissions in the form of greenhouse gases and particulate matter may be reduced by the present invention. Further, the present invention may also eliminate or reduce the noise associated with engine idling to produce compressed air and avoid the freezing of engine water. Further, multiple air compressor system 100 offers the advantage of redundancy for locomotive reliability and additional capacity for peak short term demand for compressed air.

The present invention provides the ability to apply compressed air to the cars of a train when the train is parked in a stationary position without idling the locomotive's internal combustion engine to generate electrical power or compressed air. Maintaining a reliable and constant supply of compressed air to the cars and systems of the attached train offers the advantage of a more expeditious brake departure test protocol prior to dispatching the train.

Multiple compressor system 100 includes at least two unique modes of operation. The first mode of operation may correspond to when the locomotive engine is running. The second mode of operation may correspond to when the locomotive engine is shutdown and another source of power is used, such as shore power as described above.

Figure 2A:
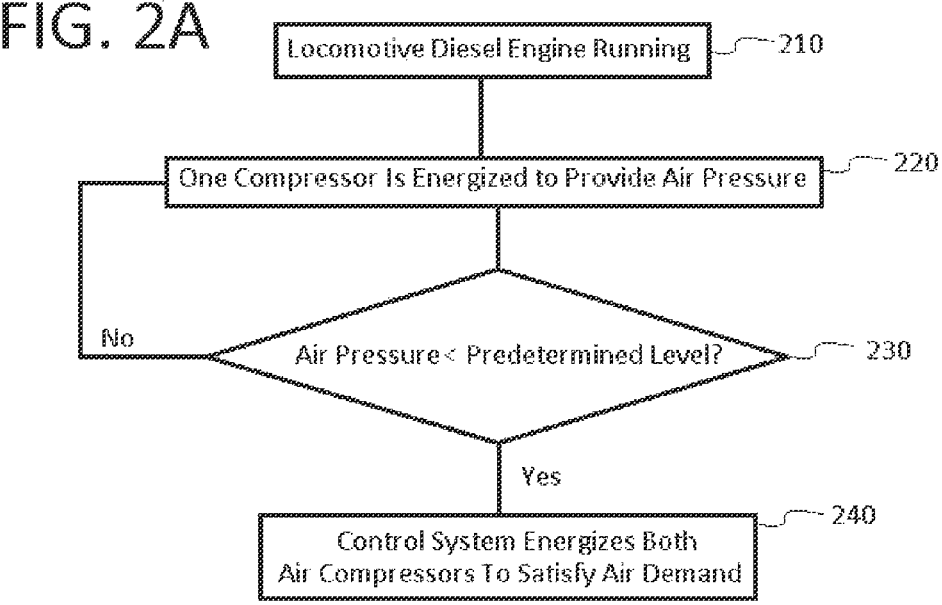
FIG. 2A is a flowchart of a method for operating an air compressor system on a diesel locomotive engine according to an embodiment of the present invention.

Referring now to FIG. 2A, a flowchart of one embodiment of the present invention is depicted. When the diesel engine of the locomotive is running, as at 210, the following logic would be used to govern the operation of the multiple air compressor system 100. At 220, based upon a time interval, one compressor would be favored for operation over the other. If air pressure remains above a predetermined amount at 230, one air compressor will continue to be used to satisfy the air demand, if the system air pressure falls below the predetermined amount at 230, the control system 104 will energize both air compressors 102 to satisfy the air demand, as at 240.

Once an air compressor 102 is energized, it will be run until the temperature of air compressors oil 124 is at a predetermined level. If the current locomotive air demand is satisfied, the air compressor 102 will be run unloaded until the oil 124 reaches the predetermined temperature.

Once the locomotive air demand is satisfied, the energized air compressor(s) 102 will be unloaded for a predetermined time period. During this predetermined time period, air pressure throughout the system may be monitored by the control system 104 to determine if it is falling at a rate which would require an air compressor 102 to be reenergized within a determined interval of shutdown. If this condition is met, the energized air compressor(s) 102 will continue to operate in an unloaded state until the locomotive air demand necessitates further air pressure. For example, if the air pressure is falling at such a rate that an air compressor 102 will need to be energized within ten minutes of shutting down, the control system 104 will instead direct air compressor 102 to operate in an unloaded state rather than to shut down air compressor 102 only to reenergize it less than ten minutes later.

Each air compressor 102 will be monitored by the control system 104. If an air compressor 102 fails to energize, run, or operate in any manner, a fault signal will be returned to the control system 104 via operative connection 110 and the other air compressor 102 may be utilized to satisfy current demand.

The air compressor's oil 124 shares a heat exchanger 120 with the locomotive's engine coolant 122, thus providing cooling for the air compressor's oil 124 while providing heating for the engine coolant 122.

Figure 2B:
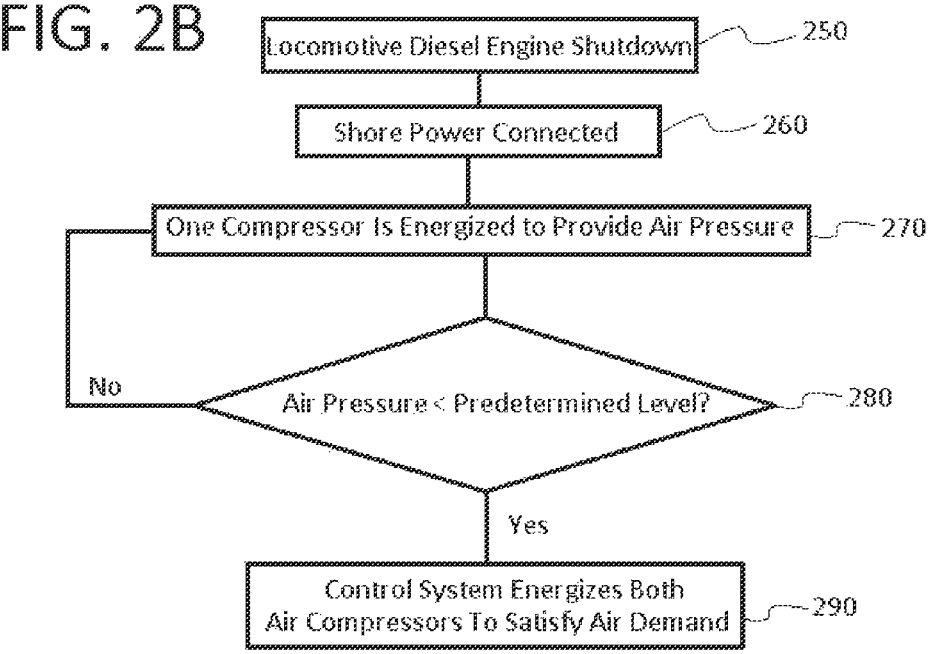
FIG. 2B is a flowchart of a method for operating an air compressor system on a diesel locomotive engine according to another embodiment of the present invention.

Referring now to FIG. 2B, a flowchart of another embodiment of the present invention is depicted. At 250, when the diesel engine of the locomotive is not running, a shore power connection may be made at 260. Once the shore power is connected, the following logic may be used to govern the operation of the multiple air compressor system 100.

Initially, at 270, one air compressor 102 will be energized and utilized to provide air pressure to the multiple air compressor system 100. The energized air compressor 102 will be determined, for example, according to a time schedule, with one air compressor 102 alternatively being favored over another air compressor 102, on a rotating basis, balancing their duty cycle. Only one air compressor 102 will be maintained in the "hot and ready" state.

At 280, as long as the air pressure is maintained above a predetermined amount, one air compressor 102 will be utilized, as shown at 270. However, at 280, when air pressure falls below this predetermined amount, both air compressors 102 will be energized to satisfy the air demand, at 290.

Figure 3:
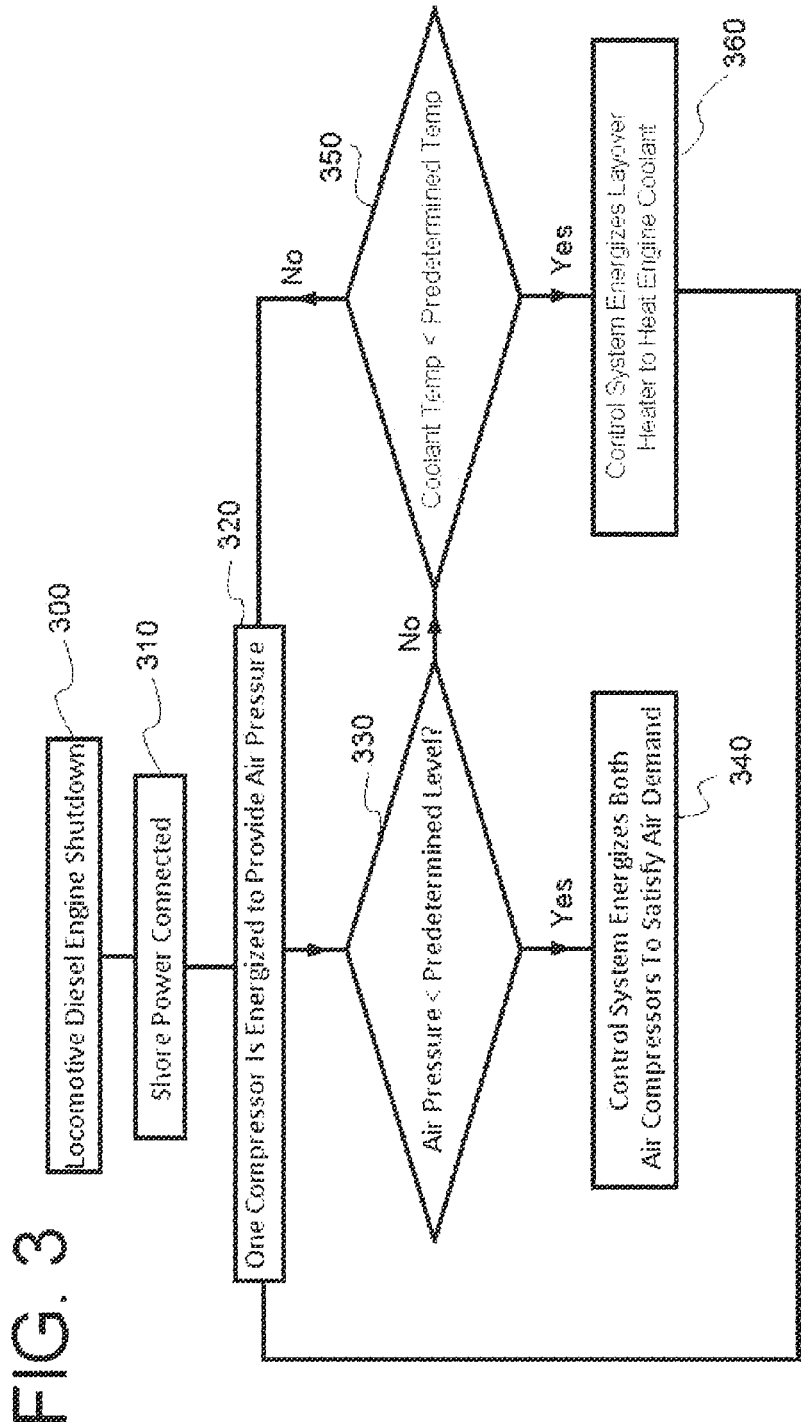
FIG. 3 is a flowchart of a method for operating an air compressor system on a diesel locomotive engine according to another embodiment of the present invention.

Referring now to FIG. 3, a flowchart of another aspect of the present invention is depicted. At 300, when the diesel engine of the locomotive is not running, a shore power connection may be made at 310. Once the shore power is connected, the following logic may be used to govern the operation of the multiple air compressor system 100.

Initially, at 320, one air compressor 102 will be energized and utilized to provide air pressure to the multiple air compressor system 100. The energized air compressor 102 will be determined, for example, according to a time schedule, with one air compressor 102 alternatively being favored over another air compressor 102, on a rotating basis, balancing their duty cycle. Only one air compressor 102 will be maintained in the "hot and ready" state.

At 330, when air pressure falls below a predetermined amount, both air compressors 102 will be energized to satisfy the air demand, at 340. But as long as the air pressure is maintained above a predetermined amount, the process proceeds to the next step at 350. At 350, as long as the engine coolant temperature remains above a predetermined temperature, one compressor 102 will continue to be energized and utilized to provide air pressure to the multiple air compressor system 100. However, if at 350 the coolant temperature falls below the predetermined temperature, at 360 layover heater 106 may be energized as described above to provide heat to the engine coolant. The process may then begin again at 320, with one compressor providing air pressure.

Also, another embodiment (not pictured) of the present invention may include a mode of operation to run only the layover heater 106 and not either of the air compressors 102. This mode may be preferred when the locomotive is scheduled to be shutdown and a constant air supply is not needed, but it is still desirable to maintain the engine coolant at a certain temperature.

The embodiments described above are given as illustrative examples only. It will be readily appreciated by those skilled in the art that many deviations may be made from the specific embodiments disclosed in this specification without departing from the invention. Accordingly, the scope of the invention is to be determined by the claims below rather than being limited to the specifically described embodiments above.

What is claimed is:

1. A compressed air system for a railroad locomotive comprising:
    a first air compressor;
    a second air compressor;
    a layover heater for maintaining a temperature of an engine coolant; and
    a control system, said control system operatively connected to said first air compressor, said second air compressor, and said layover heater, wherein said control system controls said layover heater and said first and second air compressors by:
    monitoring demand for electrical power by said first air compressor, said second air compressor, and said layover heater; and
    prioritizing and allocating electrical power to said first air compressor, said second air compressor, and said layover heater to maintain a desired level of compressed air and a desired coolant temperature; and
    wherein said control system operating the compressed air system (a) utilizes a first control logic when the first air compressor, the second air compressor, and the layover heater are powered by an onboard electrical power source, and
    (b) utilizes a second control logic different from the first control logic when the first air compressor, the second air compressor, and the layover heater are powered by an offboard electrical power source;
    further comprising a heat exchanger, wherein the control system controls heat generated by at least one of the first air compressor and the second air compressor to maintain the temperature of the engine coolant.

2. The compressed air system of claim 1, wherein the first air compressor, the second air compressor, the layover heater, and the control system is powered by at least one of the following power sources:
    the onboard electrical power source;
    or an offboard power source.

3. The compressed air system of claim 2, wherein the offboard power source comprises alternating current supplied from a power grid.

4. The compressed air system of claim 1, wherein the control system is configured to monitor a current air pressure of the compressed air system and energize either the first air compressor, the second air compressor, or both the first air compressor and second air compressor simultaneously.

5. The compressed air system of claim 4, wherein the first air compressor and the second air compressor are configured to run in an unloaded state.

6. The compressed air system of claim 1, wherein the second logic is configured to maintain the engine coolant temperature by one of the following:
    the layover heater;
    the heat exchanger; or combination of the layover heater and the heat exchanger.

7. A method of operating a compressed air system for a locomotive, said compressed air system comprising an engine, a first air compressor, a second air compressor, a layover heater, and a control system, comprising:
    determining that the engine is not shutdown;
    energizing the first air compressor to provide air pressure to the compressed air system; and
    monitoring air pressure within the compressed air system; and
    controlling said layover heater and said first and second air compressors by:
    monitoring demand for electric power by said first air compressor and said layover heater; and
    prioritizing and allocating electric power to said first air compressor and said layover heater to maintain a desired level of compressed air and a desired coolant temperature; and
    wherein said first and second air compressors are controlled based on:
    (a) a first control logic when the first air compressor, the second air compressor, and the layover heater are powered by an onboard electrical power source, and
    (b) a second control logic different from the first control logic when the first air compressor, the second air compressor, and the layover heater are powered by an offboard electrical power source;
    monitoring a temperature of an engine coolant; and
    maintaining the temperature of the engine coolant based on said monitoring step,
    wherein said maintaining step comprises:
    using a heat exchanger to provide cooling for an oil supply used by at least one of the first air compressor and the second air compressor; and
    controlling the heat exchanger to provide heating for the engine coolant.

8. The method of claim 7, further comprising:
    energizing the second air compressor if the monitored air pressure drops below a predetermined level, such that both the first air compressor and the second air compressor are simultaneously energized; and
    controlling said layover heater in coordination with said energizing of said first and second air compressors.

9. The method of claim 7, further comprising:
running the first air compressor in an unloaded condition if the monitored air pressure is above a predetermined level.

10. A method of operating a compressed air system for a locomotive, said compressed air system comprising an engine, a first air compressor, a second air compressor, a layover heater, a heat exchanger, a source of shore power, and a control system, comprising:
determining that the engine is shutdown;
connecting the source of shore power to the compressed air system;
monitoring air pressure within the compressed air system;
determining a demand for air pressure; and
energizing the first air compressor to provide air pressure to the compressed air system if said determining step requires air pressure to satisfy demand; and
controlling said layover heater and said first and second air compressors by:
monitoring demand for electric power by said first air compressor and said layover heater; and
prioritizing and allocating electric power to said first air compressor and said layover heater to maintain a desired level of compressed air and a desired coolant temperature; and
wherein said first and second air compressors are controlled based on:
(a) a first control logic when the first air compressor, the second air compressor, and the layover heater are powered by an onboard electrical power source, and
(b) a second control logic different from the first control logic when the first air compressor, the second air compressor, and the layover heater are powered by an offboard electrical power source;
monitoring a temperature of an engine coolant; and
maintaining the temperature of the engine coolant based on said monitoring step,
wherein said maintaining step comprises:
using a heat exchanger to provide cooling for an oil supply used by at least one of the first air compressor and the second air compressor; and
controlling the heat exchanger to provide heating for the engine coolant.

11. The method of claim 10, further comprising:
energizing the second air compressor if the monitored air pressure drops below a predetermined level, such that both the first air compressor and the second air compressor are simultaneously energized; and
controlling said layover heater based on said energizing of said first and second air compressors.

12. The method of claim 10, further comprising:
running at least one of the first air compressor or the second air compressor in an unloaded condition if the monitored air pressure is above a predetermined level.

13. The method of claim 10, wherein said maintaining step comprises:
using the layover heater to provide heating for the engine coolant.

14. The method of claim 13, wherein the layover heater is powered by the source of shore power.

* * * * *